(12) United States Patent
Graff

(10) Patent No.: US 8,713,226 B2
(45) Date of Patent: Apr. 29, 2014

(54) DEVICE FOR TRANSMITTING DATA BETWEEN A SERIAL DATA BUS AND WORKING MODULES SUCH AS ACTUATOR MODULES AND/OR I/O MODULES

(75) Inventor: Uwe Graff, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 101 days.

(21) Appl. No.: 13/383,057

(22) PCT Filed: Jun. 2, 2010

(86) PCT No.: PCT/EP2010/003357
§ 371 (c)(1),
(2), (4) Date: Jan. 9, 2012

(87) PCT Pub. No.: WO2011/006558
PCT Pub. Date: Jan. 20, 2011

(65) Prior Publication Data
US 2012/0110227 A1 May 3, 2012

(30) Foreign Application Priority Data
Jul. 17, 2009 (DE) .......................... 10 2009 033 691

(51) Int. Cl.
*G06F 13/12* (2006.01)
*G06F 13/38* (2006.01)

(52) U.S. Cl.
USPC ............................................. 710/71; 710/69

(58) Field of Classification Search
USPC .................................................... 710/71, 69
See application file for complete search history.

(56) References Cited

U.S. PATENT DOCUMENTS

| 4,847,613 | A | * | 7/1989 | Sakurai et al. ................. 340/9.1 |
| 5,841,360 | A | | 11/1998 | Binder |
| 2003/0040881 | A1 | * | 2/2003 | Steger et al. ................... 702/123 |
| 2005/0288799 | A1 | | 12/2005 | Brewer et al. |
| 2007/0019560 | A1 | * | 1/2007 | Brewer et al. ................. 370/252 |
| 2007/0044842 | A1 | * | 3/2007 | Boertje et al. ................. 137/382 |

FOREIGN PATENT DOCUMENTS

DE 4230414 3/1994
WO WO2007012014 1/2007

OTHER PUBLICATIONS

Balluff GmbH: "IO-Link, System Components for Industrial Communication", Full CatalogueNr. 862617, pp. 1-24, Jul. 31, 2008, XP-002593081.
Balluff GmbH: "IO-Link Communication Specification, Version 1.0", Bd. I0L-09-0001, Nr. 10.0002, pp. 1-134, Jan. 31, 2009, XP-002593082.

* cited by examiner

*Primary Examiner* — Farley Abad
(74) *Attorney, Agent, or Firm* — Hoffmann & Baron, LLP

(57) ABSTRACT

The invention concerns a device for transmitting data between a serial data bus and working modules, wherein the data bus is connected to a bus node in a bus module having at least two serial communication ports which are connected to ports of a hub connected to or integrated with the bus node, wherein the communication ports are designed for the connection and for the power supply of the working modules and wherein at least one of the working modules is designed as an actuator and/or I/O module comprising a serial-to-parallel converter for the parallel connection of actuators and/or I/O interfaces provided on or connected to the respective working module.

11 Claims, 3 Drawing Sheets

DEVICE FOR TRANSMITTING DATA BETWEEN A SERIAL DATA BUS AND WORKING MODULES SUCH AS ACTUATOR MODULES AND/OR I/O MODULES

This application claims priority based on an International Application filed under the Patent Cooperation Treaty, PCT/EP2010/003357, filed Jun. 2, 2010, which claims priority to DE102009033691.5, filed Jul. 17, 2009.

BACKGROUND OF THE INVENTION

A device of this type is in particular suitable for the actuation of valve banks by means of a data bus.

From DE 42 30 414 C2, an electropneumatic control unit is known, wherein several valves, each being equipped with working modules, can be actuated via a data bus. All of the working modules are connected in parallel to the data bus and convert the serial data of the data bus into control signals, in particular parallel control signals, for the respective valves. If a larger number of valves or valve banks is involved, in particular, such an arrangement offers little variability, in particular if further working modules with different functions have to be controlled by or communicate with one and the same data bus.

From U.S. 2005/0288799 A1, a device for transmitting data is known, wherein a plurality of sensors can transmit their data via a data bus, for example to a microcomputer. As a communication protocol for the bus system, the HART protocol, the FOUNDATION field bus protocol and the Profibus-PA protocol may be used for example. In addition, the connected sensors may be supplied with energy via the data bus. To supplement the sensors, actuators can be connected to the data bus as well.

SUMMARY OF THE INVENTION

The present invention is based on the problem of making a data transmission device of this type more variable, so that different working modules can be controlled and communicated with via a single data bus in a simple and cost-effective way.

According to the invention, this problem is solved by a device for transmitting data with the features of claim 1.

The device according to the invention offers in particular the advantage that, compared to known prior art, the individual interfaces or communication ports can be adapted optimally to the required communication power and voltage supply of the working modules, e.g. in terms of baud rate and the like. This results in a cost-effective arrangement of the connecting elements, such as plug-and-socket connectors, for the communication ports and internal electronics for serial communication. It allows moreover for a variable and compact arrangement of the working modules.

The measures listed in the dependent claims allow for advantageous further developments of and improvements to the device specified in claim 1.

The serial connections between the hub and the working modules are preferably designed as point-to-point connections, in particular as IO link connections, the hub in particular being designed as IO link master, while the respective serial-to-parallel converter in the working modules is designed as IO link slave.

The communication ports are expediently designed as plug-and-socket connections for plugging the working modules onto the bus module, the communication ports being preferably arranged in a linear grid. Owing to this arrangement, the working modules, including different working modules in particular, can be connected in virtually any way.

At least one of the working modules designed as actuator and/or I/O modules is advantageously provided with connecting means for connecting and/or plugging on an actuator assembly comprising at least one actuator, this actuator assembly being preferably designed as a valve bank. As a result, the device can in a simple and variable manner be configured or assembled by plugging together bus modules, working modules and actuator assemblies.

In an advantageous manner, at least one of the working modules designed as actuator and/or I/O modules comprises at least one I/O interface which is preferably designed as a plug contact arrangement. External components and assemblies, such as sensors, switches or external actuators, can then be connected to such interfaces. These I/O interfaces are expediently designed as parallel interfaces.

At least one of the working modules can advantageously be designed as a functional module, in particular as a sensor module.

BRIEF DESCRIPTION OF THE DRAWINGS

Embodiments of the invention are shown in the drawing and explained in greater detail in the following description. Of the drawing.

DETAILED DESCRIPTION OF THE PREFERRED EMBODIMENTS

Figure 1:
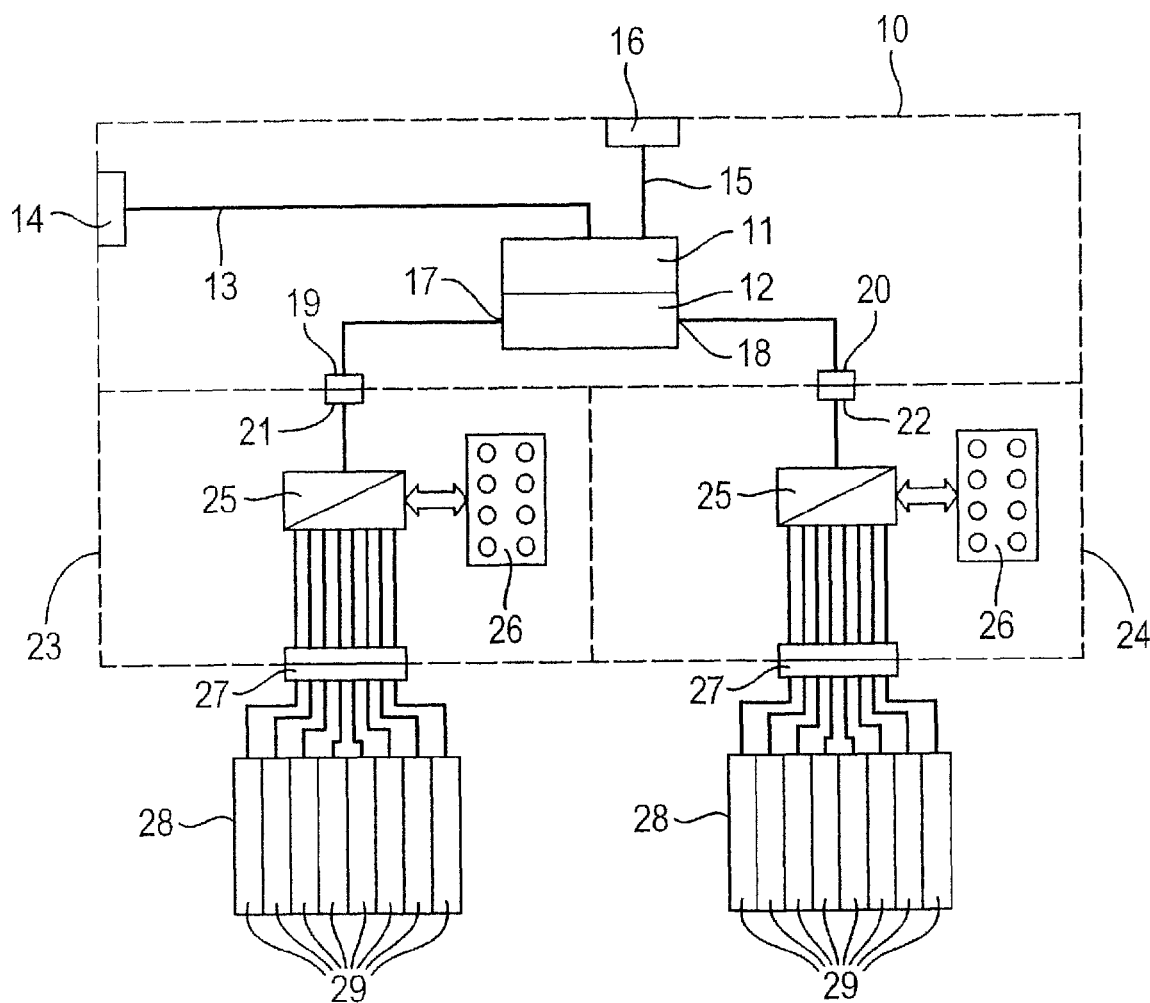
FIG. 1 is a schematic block diagram of a device, wherein two actuator and I/O modules are plugged or connected to a bus module as an embodiment of the invention.
Figure 2:
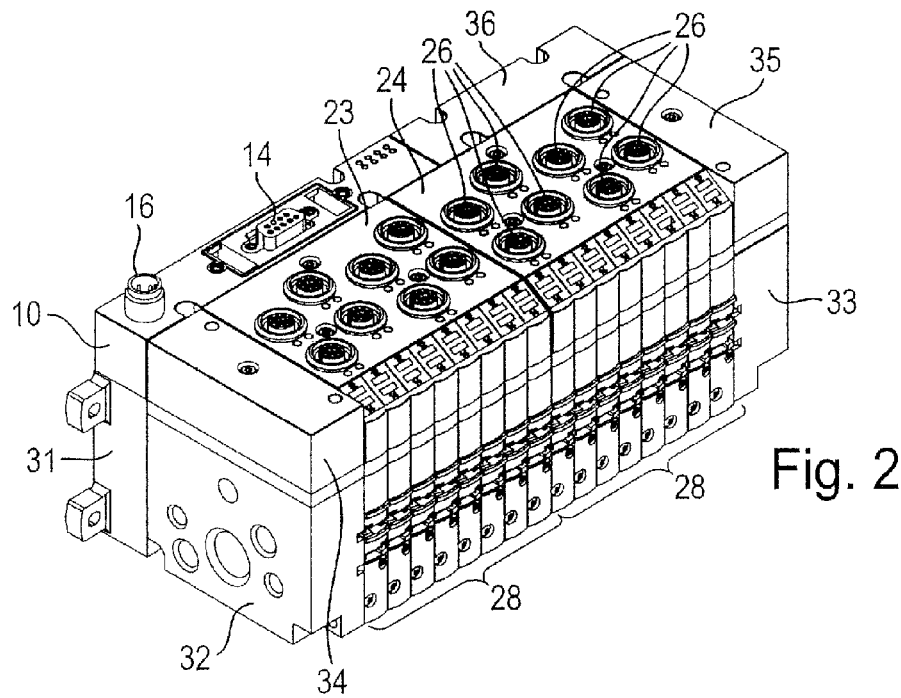
FIG. 2 is a perspective view of the device illustrated in FIG. 1 in a realistic representation.
Figure 3:
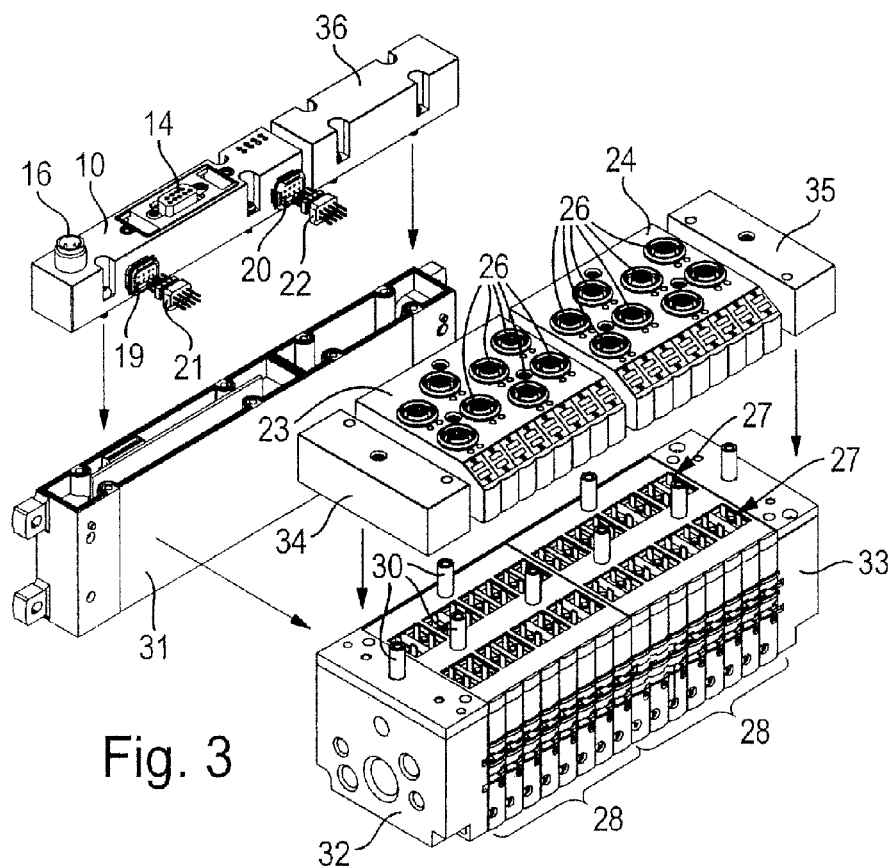
FIG. 3 is a perspective exploded view of the device illustrated in FIG. 2.

In the first embodiment shown in FIGS. 1 to 3, a bus module 10 includes a bus node 11 (bus station) connected to a hub 12 or forming an integrated arrangement together therewith. A data bus 13, for example a field bus, which can be connected to a suitable external data bus via a bus interface 14, is connected to the bus module 10, so that the bus module 10 can be connected to an external central control room or control unit. The bus module 10 is further connected to voltage supply lines 15 which can be supplied via a power connector by means of an external cable not shown in the drawing.

Two ports 17, 18 of the hub 12, these being serial ports 17, 18, are connected to two communication ports 19, 20 on the outside of the bus module 10. The number of ports 17, 18 and the corresponding number of communication ports 19, 20 may obviously be greater and vary.

Two working modules 23, 24 designed as actuator and I/O modules are connected to the communication ports 19, 20 via plug-and-socket connectors 21, 22. Each working module comprises a serial-to-parallel converter 25 for converting the serial signals fed through the communication ports 19, 20 into parallel signals. The serial connections between the hub 12 and the serial-to-parallel converters 25 are designed as point-to-point connections, for example as IO link connections. In the latter case, the hub 12 is an IO link master, while the serial-to-parallel converters 25 are designed as IO link slaves. In principle, other point-to-point-connections or other serial connecting means can be used.

In place of the plug-and-socket connectors 23, 24, suitable plugs which can be plugged into communication ports 19, 20 designed as sockets can be provided on the working modules 23, 24, or the communication ports 19, 20 may be designed as plugs for insertion into corresponding sockets of the working modules 23, 24.

According to FIGS. 2 and 3, the tops of the working modules 23, 24 are provided with I/O interfaces 26 designed as plug contact arrangements, each of which is connected to a parallel port of the serial-to-parallel converters 25. The undersides of the working modules 23, 24 are further provided with plug-in connections 27 for electric connection to valve banks 28, each of which comprises eight plate valves 29 lined up adjacent to one another. For securing the working modules 23, 24 mechanically to the valve banks 28, suitable mechanical plug-in connecting elements 30 are provided. Other mechanical mounting arrangements, such as screw connections, latching means or the like, can be used as an alternative. Each of the plate valves 29 is connected to a corresponding parallel port of the serial-to-parallel converters 25 via the plug-in connections 27.

The data bus 13 can communicate with and control the I/O interfaces 26 and the plate valves 29 via the bus node 11, the hub 12 and the serial-to-parallel converters 25.

The number of working modules 23, 24 connected to the bus module 10 may be greater if a correspondingly greater number of communication ports 19, 20 is provided. Instead of combined actuator and I/O modules, the working modules 23, 24 may be pure actuator modules and/or pure I/O modules. Instead of the valve banks 28, plate valves 29 or other valves, other or different actuators can be connected to the working modules 23, 24. Via the interfaces 26, external actuators can be controlled, sensor signals can be received via suitable sensor lines, or other communication processes can be carried out.

Via the connecting lines between the hub 12 on the one hand and the serial-to-parallel converters 25 on the other hand, the necessary supply and operating voltages can also be supplied, on the one hand for the operation of the connected actuators and on the other hand for supplying external devices via the interfaces 26 if required.

For the mechanical construction and/or assembly of the overall arrangement, a plate-type mounting element 31 is provided, on which the bus module 10 can be placed and secured. In contrast to the illustrated embodiment, the bus module 10 may form an integrated assembly together with the mounting element 31, which also forms the bus module. On the flat side of the mounting element 31, the two valve banks 28 are mounted and/or secured, the end regions of the lined-up valve banks 28 being covered by blanking elements 32, 33. These blanking elements 32, 33 can likewise be secured, for example bolted, to the mounting element 31. The two working modules 23, 24 are placed on the valve banks 28 and electrically connected to the plate valves 29 or other valves of the valve bank 28 via the plug-in connections 27, mechanical plug-in connecting elements 30 being provided for a better mechanical connection. The two side-by-side working modules 23, 24 are likewise provided at both ends with blanking elements 34, 35, which are placed on and secured to the blanking elements 32, 33 of the valve banks 28. In this arrangement, the bus module 10 is also electrically connected to the two working modules 23, 24 via the communication ports 19, 20 and the plug-and-socket connectors 21, 22.

In the illustrated embodiment, the bus module 10 is shorter than the mounting module 31, and an extension element 36 is provided for adaptation. The extension element 36, which increases the length of the bus module 10, may obviously be integrated with the bus module 10 as a single piece.

The various components and assemblies described above can of course be assembled in different ways. The lined-up working modules 23, 24 may differ in their functions, the number of working modules 23, 24 being determined by the number of available communication ports 19, 20. The width of the working modules 23, 24 may also vary, with the proviso that the grid of communication ports 19, 20 has to be taken into account.

The electric connections between the working modules 23, 24 and the bus module 10 are established as the narrow sides are plugged together. The configuration of these connections may, however, vary; the working modules 23, 24 and the bus module 10 may for example overlap in a stepped manner, thereby altering the plug-in direction by 90 degrees.

Figure 4:
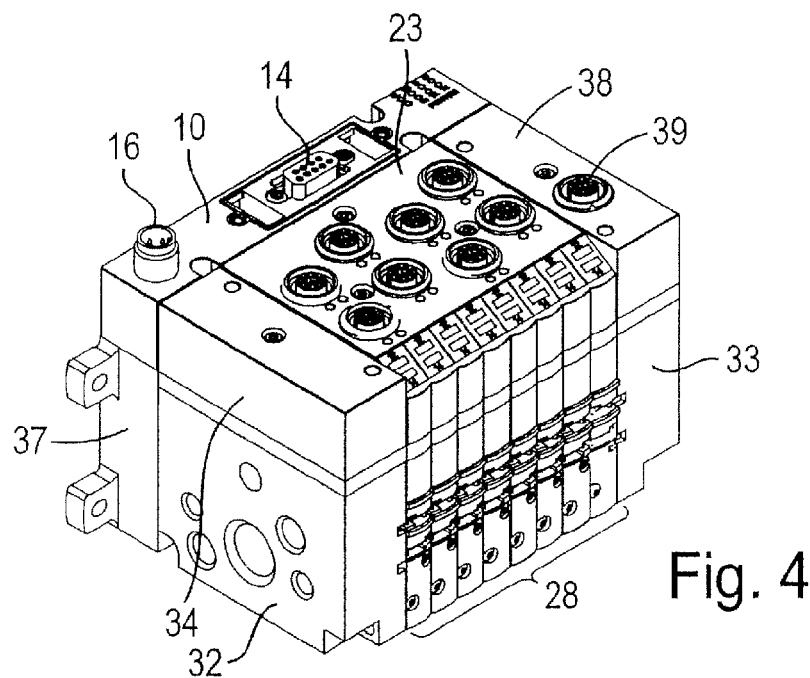
FIG. 4 is a perspective view of a second embodiment of the invention, wherein an actuator and an I/O module as well as a functional module are plugged or connected to a bus module.
Figure 5:
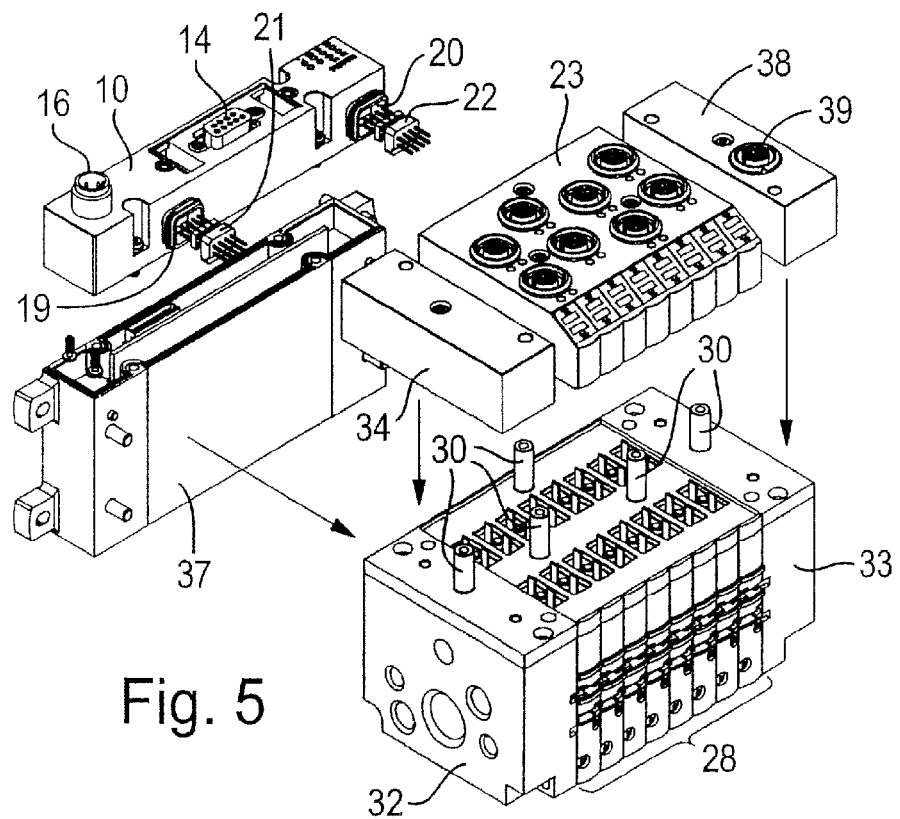
FIG. 5 is a perspective exploded view of the embodiment illustrated in FIG. 4.

In the second embodiment shown in FIGS. 4 and 5, only one working module 23 and one valve bank 28 are provided. The length of a shorter plate-type mounting element 37 is matched to the length of the bus module 10. In series with the working module 23, a functional module 38, which may be a sensor module for detecting pressure, temperature and the like and/or an actuator module, is provided. If designed as an actuator module, it may for example be a valve or at least comprise a valve, such as a proportional valve, a soft-start valve or the like. This functional module 38 is electrically connected to the communication port 20 via the plug-and-socket connector 22. Communication with external devices, such as actuators and/or sensors, is possible via an interface 39 designed as a plug-in connection.

This embodiment, too, may comprise any number of working modules 23 and functional modules 38, and their sequential arrangement is subject to hardly any restrictions, having only to correspond to the arrangement of the communication ports 19, 20.

The invention claimed is:

1. A device for transmitting data between a serial data bus and working modules, wherein the data bus is connected to a bus node in a bus module having at least two serial communication ports which are connected to ports of a hub connected to or integrated with the bus node wherein the communication ports are designed for the connection and for the power supply of the working modules, and wherein at least one of the working modules is designed as an actuator and/or I/O module comprising a serial-to-parallel converter for the parallel connection of actuators and/or I/O interfaces provided on or connected to the respective working module:

wherein the serial connections between the hub and the working modules are IO link point-to-point connections, wherein an IO link point-to-point connection has a common single electrical line for clock pulses and data, wherein the hub is the IO link master, and wherein the respective serial-to-parallel converter in the working modules is an IO link slave.

2. A device according to claim 1, wherein the communication ports are designed as plug-and-socket connections for plugging the working modules to the bus module.

3. A device according to claim 2, wherein the communication ports are arranged in a linear grid.

4. A device according to claim 1, wherein at least one of the working modules designed as working and/or I/O modules comprises connecting means for connecting and/or plugging in an actuator assembly comprising at least one actuator.

5. A device according to claim 4, wherein the actuator assembly is a valve bank.

6. A device according to claim 1, wherein at least one of the working modules designed as actuator and/or I/O modules comprises at least one I/O interface.

7. A device according to claim 6, wherein the at least one I/O interface is designed as a plug contact arrangement.

8. A device according to claim 6, wherein the at least one I/0 interface is designed as a parallel interface.

9. A device according to claim 1, wherein at least one of the working modules is designed as a functional module.

10. A device according to claim 9, wherein the at least one working module designed as a functional module is a sensor and/or actuator module.

11. A device according to claim 9, wherein the at least one working module designed as a functional module has an interface for connection to external devices.

* * * * *